United States Patent [19]

DiLeone et al.

[11] 4,226,989

[45] Oct. 7, 1980

[54] MELAMINE-MONOPHTHALIMIDES

[75] Inventors: Roland R. DiLeone, Rowayton; Jeno G. Szita, Norwalk, both of Conn.

[73] Assignee: American Cyanamid Company, Stamford, Conn.

[21] Appl. No.: 58,883

[22] Filed: Jul. 19, 1979

[51] Int. Cl.$^3$ ............................................ C07D 403/04
[52] U.S. Cl. .................................................... 544/198
[58] Field of Search ........................................ 544/198

[56] References Cited

U.S. PATENT DOCUMENTS 4,113,725  9/1978  Nnadi et al. ..................... 544/198

*Primary Examiner*—John M. Ford
*Attorney, Agent, or Firm*—Gordon L. Hart

[57] ABSTRACT

Melamine monophthalimides and its halogenated derivatives are novel compounds having utility as plasticizers or fire retardants in resin composition.

4 Claims, No Drawings

MELAMINE-MONOPHTHALIMIDES

The invention relates to novel compounds having utility as flame retardants in thermoplastic resin compositions or as modifiers for melamine resin compositions, or both. The novel compositions are the monophthalimide of melamine and the tetrahalo-phthalimides of melamine. The novel compounds are represented by the formula

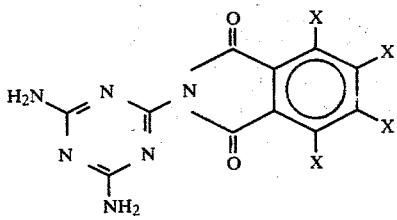

wherein each X represents a member selected from the group consisting of hydrogen and halogen atoms.

The novel compounds can be prepared by reacting melamine with phthalic anhydride or a halogenated phthalic anhydride in a suitable solvent at suitable reaction temperature, for example at 100° C. Dimethylsulfoxide (DMSO) is a preferred solvent medium for the reaction. The product is easily separated by reducing the temperature of the reaction medium after the reaction and removing the product by filtration. Following are detailed descriptions of preferred method for making compounds embodying the invention.

EXAMPLE 1

Preparation of Melamine Mono(-phthalimide)

To a 3 liter reactor equipped with stirrer, thermometer and condenser is charged 2 liters of dimethylsulfoxide (DMSO) solvent followed by 252 parts of melamine and 325 parts of phthalic anhydride. The mixture is constantly agitated and heated to 100° C. After reaching 100° C., the reaction is continued for 1 hour or until all of the melamine has dissolved. At this point, the reaction mixture is cooled to room temperature and the product precipitated by pouring the DMSO solution into 8 l of ice water. The white solid product is then collected by filtration, washed with dilute sodium carbonate solution to remove the residual phthalic acid, then water until the water wash is neutral. The yield is quantitative. The product is pure as obtained and has a melting point of 285–287° C., and the following elemental analysis calculated for $C_{11}H_8N_6O_2$; C,51.56; H,3.24; N,32.80; found C,51.65; H,3.26; N,31.88.

This compound is soluble in dimethylformamide and dimethylsulfoxide. It readily reacts with 37% formaldehyde which makes it useful as additive constituting 10% to 50% by wt in melamine-formaldehyde resins for modifying the brittleness of such resins.

EXAMPLE 2

Preparation of Melamine-Mono(tetrachlorophthalimide)

To a one-liter reactor equppped with stirrer, thermometer and condenser is charged 300 cc of dimethylsulfoxide and 150 cc toluene. To the solvent mixture is added with stirring 37.8 parts melamine and 85.8 parts tetrachlorophthalic anhydride. The reaction mixture is then heated to 100° C. and held at this temperature for 5 hours. The reaction mixture is then cooled to 20° C. and the product, which is insoluble, is collected by filtration, washed with methanol and dried. The yield is 87 parts (76%). The product is slightly soluble in DMSO and N-methyl pyrrolidone and is light yellow in color. The compound does not melt below 310° C. and has the following elemental analysis calculated for $C_{11}H_4N_6O_2Cl_4$; C,33.53; H,1.02; N,21.33; Cl,36.00; found C,33.37; H,1.24; N,21.43; Cl,35.90.

This compound has been found useful as a flame retardant for polypropylene and polystyrene.

EXAMPLE 3

Preparation of Melamine-Mono(tetrabromophthalimide)

To a one-liter reactor equipped with stirrer, thermometer and condenser is charged 300 cc of DMSO and 150 cc toluene. To the solvent mixture is added with stirring 37.8 parts melamine and 139.2 parts tetrabromophthalic anhydride. The reaction mixture is then heated at 100° C. and held at this temperature for 5 hours. The reaction mixture is then cooled ato 20° C. and the product, which is insoluble, is collected by filtration, washed with methanol and dried. The yield is 120 parts (70%). The product shows no significant solubility in any solvent, has a very light yellow color and does not melt below 316° C. The compound has the following elemental analysis calculated for $C_{11}H_4N_6O_2Br_4$; C,23.10; H,0.70; N,14.7; Br,55.9; found C,23.20; H,0.78, N,14.8; Br,54.2.

This compound has been found useful as a flame retardant additive in polypropylene and polystyrene compositions.

The product of Example 3 above was tested as an additive in combination with a synergist, antimony oxide, in 2:1 ratio for flame retardant activity in polypropylene and in impact polystyrene formulations. The flamability test used was the test method described in Underwriters Laboratories Test UL 94 Vertical Test Method (September 1973).

The additive mixture is blended with polymer powder in the selected proportions and extruded by melt index extrusion apparatus. Extrusion temperature is 280° C. for polypropylene and 250° C. for impact polystyrene. The extrudates, rods of about ¼ in. diameter, 3 to 5 inches long, are tested by ignition in accordance with the test procedure.

Using a blend of 55% by weight of Hercules Profax 6401 (Trademark) polypropylene with 30% by weight of melamine-mono(tetrabromophthalimide) and 15% by wt. of antimony oxide, rods were extruded and tested as described. The UL 94 test rating was V-1, which indicates flame extinguishment within 5–25 seconds after the ignition source is removed, and indicates no ignition of cotton by dripping of the burning plastic, in the test procedure. Control samples were rated FB which indicates no flame extinguishment within 25 seconds, by the same test.

A formulation of 77.5% by wt. of Cosden 825 impact polystyrene, 15% melamine-mono(tetrabromophthalimide) and 7.5% antimony oxide, extruded and tested as described above, were rated V-O in the UL 94 test. This indicates flame extinguishment in the test within 5 seconds after the ignition source is removed. Control samples were rated FB by the same test.

The melamine-mono(tetrachlorophthalimide) was tested as fire retardant in an impact polystyrene resin composition containing 20% of the retardant compound. By the standard oxygen index test the test composition had oxygen index of 21.5 while the control resin had oxygen index of only 18.4.

We claim:

1. A compound defined by the formula

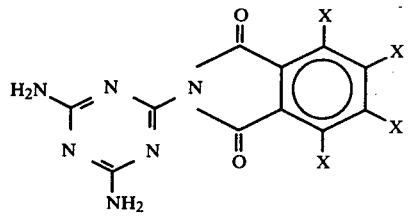

wherein each X represents a member selected from the group consisting of hydrogen and halogen atoms.
2. Melamine-mono(phthalimide).
3. Melamine-mono(tetrachlorophthalimide).
4. Melamine-mono(tetrabromophthalimide).

* * * * *